United States Patent
Ide et al.

(10) Patent No.: US 6,842,679 B2
(45) Date of Patent: Jan. 11, 2005

(54) ACTIVATION DEVICE FOR PASSENGER PROTECTION APPARATUS

(75) Inventors: Seiya Ide, Okazaki (JP); Yoshihisa Ogata, Chiryu (JP)

(73) Assignee: Denso Corporation, Kariya (JP)

( * ) Notice: Subject to any disclaimer, the term of this patent is extended or adjusted under 35 U.S.C. 154(b) by 67 days.

(21) Appl. No.: 10/443,799

(22) Filed: May 23, 2003

(65) Prior Publication Data

US 2004/0002801 A1 Jan. 1, 2004

(30) Foreign Application Priority Data

Jun. 27, 2002 (JP) .................................... 2002-187593

(51) Int. Cl.⁷ ............................ B60R 21/32; G06F 7/00
(52) U.S. Cl. ........................................ 701/45; 280/735
(58) Field of Search .................. 701/45; 280/728.1, 280/734, 735; 340/440; 307/10.1

(56) References Cited

U.S. PATENT DOCUMENTS

| | | | | |
|---|---|---|---|---|
| 6,198,997 B1 | * | 3/2001 | Ishikawa et al. | 701/45 |
| 6,301,536 B1 | * | 10/2001 | Vaessen et al. | 701/45 |
| 6,304,004 B1 | * | 10/2001 | Meyer et al. | 307/10.1 |
| 6,542,073 B2 | * | 4/2003 | Yeh et al. | 340/440 |
| 6,584,388 B2 | * | 6/2003 | Schubert et al. | 701/46 |
| 6,618,655 B2 | * | 9/2003 | Tobaru et al. | 701/45 |
| 6,626,460 B2 | * | 9/2003 | Aoki | 280/735 |

FOREIGN PATENT DOCUMENTS

| | | |
|---|---|---|
| JP | 7-164985 | 6/1995 |
| JP | 2001-260785 | 9/2001 |

* cited by examiner

Primary Examiner—Michael J. Zanelli
(74) Attorney, Agent, or Firm—Posz & Bethards, PLC

(57) ABSTRACT

An activation device for a passenger protection apparatus comprises a sensor for detecting a roll angular velocity, a unit for calculating a roll relative angle on the basis of the angular velocity, and a unit for making a judgment indicating a roll of the vehicle when the velocity and the angle satisfy a threshold condition. A control unit activates an air bag and a pretensioner at a roll judgment. A buckle switch detects a wearing state of a seat belt, and a window opening/closure sensor detects an open/closed state of a window. The threshold condition is set on the basis of the results of the detection of the buckle switch and the window opening/closure sensor. This enables the protection apparatus to be appropriately activated on the basis of a wearing state of the seat belt and an open/closed state of the window of the vehicle.

9 Claims, 7 Drawing Sheets

ACTIVATION DEVICE FOR PASSENGER PROTECTION APPARATUS

BACKGROUND OF THE INVENTION

1) Field of the Invention

The present invention relates to an activation device for a passenger protection apparatus to be mounted in a vehicle, and more particularly to a technique for activating a passenger protection apparatus at an appropriate timing in response to the occurrence of a roll (rollover) of a vehicle.

2) Description of the Related Art

So far, as a vehicle-mounted passenger protection apparatus for protecting a passenger(s) (including a driver) from the occurrence of a roll of a vehicle, for example, there have been proposed a curtain air bag designed to spread into a curtain-like configuration along a side surface portion of the vehicle, a seat belt with a pretensioner made to take up a seat belt in no time, and an apparatus made to take up a seat belt in a repeated fashion through the use of a motor or the like.

For example, as shown in a block diagram of FIG. 7, a conventional activation system 51 for a passenger protection apparatus is made up of an angular velocity sensor 61 for detecting a roll angular velocity of a vehicle, a control unit 80 including a CPU 80a, a ROM 80b and a RAM 80c, and a curtain air bag 90. When the angular velocity sensor 61 outputs a roll angular velocity signal, a relative angle calculating means 81 makes an integral calculation of a roll angular velocity to obtain a roll relative angle, and a roll judging means 83 makes a decision that the vehicle rolls sideways if the roll angular velocity and the roll relative angle satisfy a predetermined threshold condition, and then a drive control means 84 activates a curtain air bag 90.

However, the optimum activation timing of a curtain air bag can vary in accordance with an open/closed state of a window or a wearing state of a seat belt. That is, the curtain air bag is activated for the purpose of preventing a passenger (s) from being thrown out into the exterior of the vehicle in a case in which a window is in an open state while it is activated for preventing the passenger from being collided against a structure in the interior of the vehicle in a case in which the window is in an closed state, which signifies that the purpose of the activation thereof varies in accordance with an open/closed state of the window. Therefore, for achieving the purpose, there may be a need to activate it at an appropriate timing suitable for that purpose.

On the other hand, depending upon a rolling state of a vehicle (for example, in a case in which the vehicle makes a roll slowly), only the seat belt can prevent the passenger from being thrown out into the exterior of the vehicle even without using the curtain air bag, and the throw-out into the exterior of the vehicle may be preventable by the employment of a seat belt with a pretentioner or an apparatus made to take up a seat belt in a repeated fashion through the use of a motor or the like.

SUMMARY OF THE INVENTION

The present invention has been developed with a view to eliminating the above-mentioned problems, and it is therefore an object of the invention to provide an activation device for a passenger protection apparatus, capable of activating the passenger protection apparatus in accordance with a result of the detection of an open/closed state or the like.

For this purpose, in accordance with a first aspect of the present invention, there is provided an activation device for a passenger protection apparatus which is made to activate the passenger protection apparatus in accordance with a behavior of a vehicle, comprising an angular velocity sensor for detecting a roll angular velocity of the vehicle, relative angle calculating means for calculating a roll relative angle of the vehicle on the basis of the roll angular velocity detected by the angular velocity sensor, roll judging means for making a judgment indicating the occurrence of a roll of the vehicle when the roll angular velocity detected by the angular velocity sensor and the vehicle roll relative angle calculated by the relative angle calculating means satisfy a predetermined threshold condition, drive control means for activating the passenger protection apparatus when the roll judging means makes the vehicle roll judgment, state detecting means having at least one of a window opening/closure sensor for detecting an open/closed state of a window of the vehicle and a buckle switch for detecting a wearing state of a seat belt, and threshold setting means for setting the predetermined threshold condition on the basis of a result of the detection by the state detecting means.

Thus, the state detecting means detects an open/closed state of a window of the vehicle through the use of the window opening/closure sensor or detects a wearing state of the seat belt through the use of the buckle switch, and the threshold setting means sets a predetermined threshold condition for the judgment on a roll of the vehicle on the basis of the detection result by the state detecting means. Moreover, the angular velocity sensor detects a roll angular velocity of the vehicle and the relative angle calculating means calculates a roll relative angle of the vehicle on the basis of the roll angular velocity detected by the angular velocity sensor. Still moreover, the roll judging means makes a judgment indicating the occurrence of a roll of the vehicle when the angular velocity detected by the angular velocity sensor and the vehicle roll relative angle calculated by the relative angle calculating means satisfy the predetermined threshold condition set by the threshold setting means, and the drive control means activates the passenger protection apparatus when the roll judging means makes the judgment indicating the occurrence of a roll of the vehicle.

Accordingly, since the threshold condition for the judgment on a roll of the vehicle is properly set on the basis of the window open/closed state of the vehicle or the seat belt wearing state thereof, the roll judgment can be made at an appropriate timing according to a state for the activation of the passenger protection apparatus, thereby securely preventing a passenger(s) from being collided against a structure in the interior of the vehicle or from being thrown out into the exterior of the vehicle.

In addition, according to a second aspect of the present invention, in the activation device for a passenger protection apparatus stated above, the passenger protection apparatus includes a curtain air bag.

Accordingly, the curtain air bag is activable at an appropriate timing on the basis of at least one of a window open/closed state of the vehicle or a seat belt wearing state thereof.

Still additionally, according to a third aspect of the present invention, the activation device for a passenger protection apparatus stated above further comprises spread method setting means for setting a spread method for the curtain air bag on the basis of a result of the detection by the state detecting means.

Thus, the spread method setting means sets a method of spreading the curtain air bag on the detection result by the state detecting means so that the drive control means activates the passenger protection apparatus in accordance with the set spread method, which enables the activation of the curtain air bag according to an appropriate spread method on the basis of at least one of the vehicle window open/closed state or the seat belt wearing state.

Yet additionally, according to a fourth aspect of the present invention, in the activation device for a passenger protection apparatus stated above, the spread method setting means sets at least one of a spread pressure of the curtain air bag, a spread configuration thereof and a spread direction thereof.

Accordingly, for the activation of the curtain air bag, at least one of the spread pressure, spread configuration and spread direction of the curtain air bag is appropriately set on the basis of at least one of the vehicle window open/closed state and the seat belt wearing state, thereby enabling the passenger protection apparatus to protect the passenger more securely.

Moreover, according to a fifth aspect of the present invention, the activation device for a passenger protection apparatus stated above further comprises a belt take-up device for taking up the seat belt instantaneously so that the drive control means activates the belt take-up device when the roll judging means makes a judgment indicating the occurrence of a roll of the vehicle and executes spread/non-spread control of the curtain air bag in accordance with the roll angular velocity detected by the angular velocity sensor.

Thus, the drive control means activates the belt take-up device when the roll judging means makes a judgment indicating the occurrence of a roll of the vehicle, thereby preventing the passenger from being collided against a structure in the interior of the vehicle and from being thrown out into the exterior of the vehicle. At this time, in a case in which the roll angular velocity detected by the angular velocity sensor shows a large value, the spread control of the curtain air bag further takes place to prevent the passenger more surely from being collided against a structure in the interior of the vehicle and from being thrown out into the exterior of the vehicle. On the other hand, in a case in which the detected roll angular velocity shows a small value and only the take-up of the seat belt can prevent the passenger from being collided against a structure in the interior of the vehicle and from being thrown out into the exterior of the vehicle, the non-spread control of the curtain air bag takes place to enable avoiding the unnecessary spread of the curtain air bag for the purpose of the reduction of the repair cost of the vehicle.

Still moreover, according to a sixth aspect of the present invention, in the activation device for a passenger protection apparatus stated above, the roll judging means sets a threshold line on a two-dimensional map using a roll angular velocity and a roll relative angle as parameters and makes a judgment indicating the occurrence of a roll of the vehicle when a history line drawn on the basis of the roll angular velocity detected by the angular velocity sensor and the roll relative angle calculated by the relative angle calculating means runs from a non-roll area lying on a side of an origin with respect to the threshold line to a roll area lying on a side opposite to the origin with respect to the threshold line, and the threshold condition setting means includes threshold switching means for setting the threshold line on the basis of a result of the detection by the state detecting means.

Accordingly, the threshold line for the judgment on a roll of the vehicle is appropriately set on the basis of at lest one of the vehicle window open/closed state and the seat belt wearing state, thereby enabling the roll judgment at a more appropriate timing.

Yet moreover, according to a seventh aspect of the present invention, in the activation device for a passenger protection apparatus stated above, the threshold switching means sets the threshold line on the basis of one of the window open/closed state detected by the state detecting means, the seat belt wearing state detected by the state detecting means and a combination thereof.

Accordingly, a threshold line is appropriately set on a two-dimensional map on the basis of a window open/closed state, a seat belt wearing state or a combination of these states, thereby enabling a roll judgment at a more appropriate timing.

Yet moreover, according to an eighth aspect of the present invention, in the activation device for a passenger protection apparatus stated above, the state detecting means includes both the window opening/closure sensor and the buckle switch.

Accordingly, the roll judgment can be made at a more appropriate timing on the basis of the detection results of both the window opening/closure sensor and the buckle switch.

Furthermore, in accordance with a ninth aspect of the present invention, there is provided an activation device for a passenger protection apparatus which is made to activate the passenger protection apparatus in accordance with a behavior of a vehicle, comprising roll judging means for detecting the behavior of the vehicle to make a judgment indicating the occurrence of a roll of the vehicle when the vehicle behavior detected satisfies a predetermined condition, drive control means for activating the passenger protection apparatus when the roll judging means makes a judgment indicating the occurrence of a roll of the vehicle, state detecting means having at least one of a window opening/closure sensor for detecting an open/closed state of a window of the vehicle and a buckle switch for detecting a wearing state of a seat belt, and threshold setting means for setting the predetermined condition on the basis of a result of the detection by the state detecting means.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

An embodiment of an activation device for a passenger protection apparatus according to the present invention will be described hereinbelow with reference to the drawings.

Figure 1:
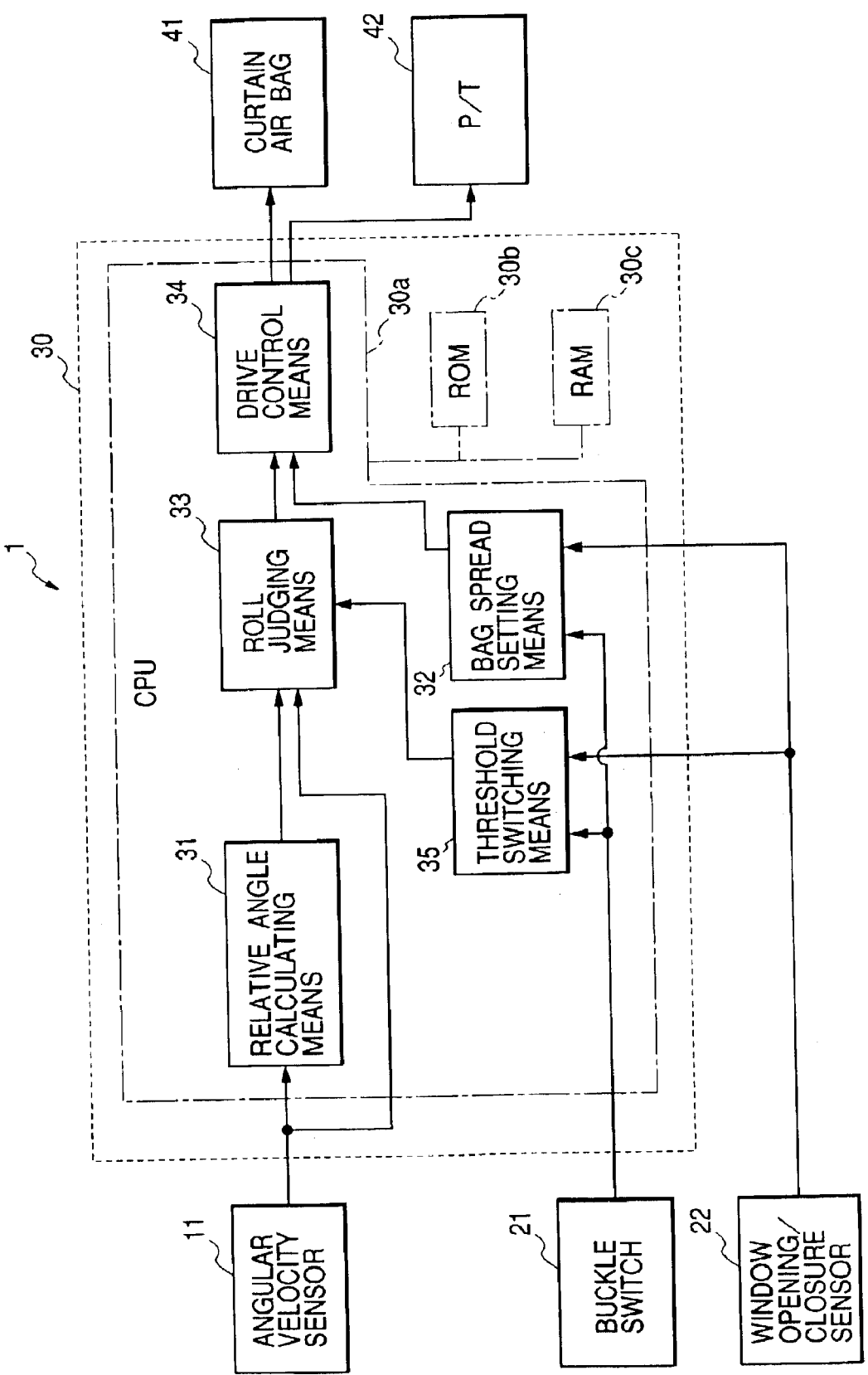
FIG. 1 is a block diagram schematically showing a configuration of a passenger protection apparatus activation system according to an embodiment of the present invention.

FIG. 1 is a block diagram showing the entire configuration of a passenger protection apparatus activation system 1 according to an embodiment of the present invention.

As FIG. 1 shows, the passenger protection apparatus activation system is made up of an angular velocity sensor 11, a buckle switch 21, a window opening/closure sensor 22, a control unit 30, a curtain air bag 41 and a pretentioner (which will be referred to hereinafter as a "P/T") 42. The buckle switch 21 and the window opening/closure sensor 22 constitute a state detecting means in the present invention.

Figure 2:
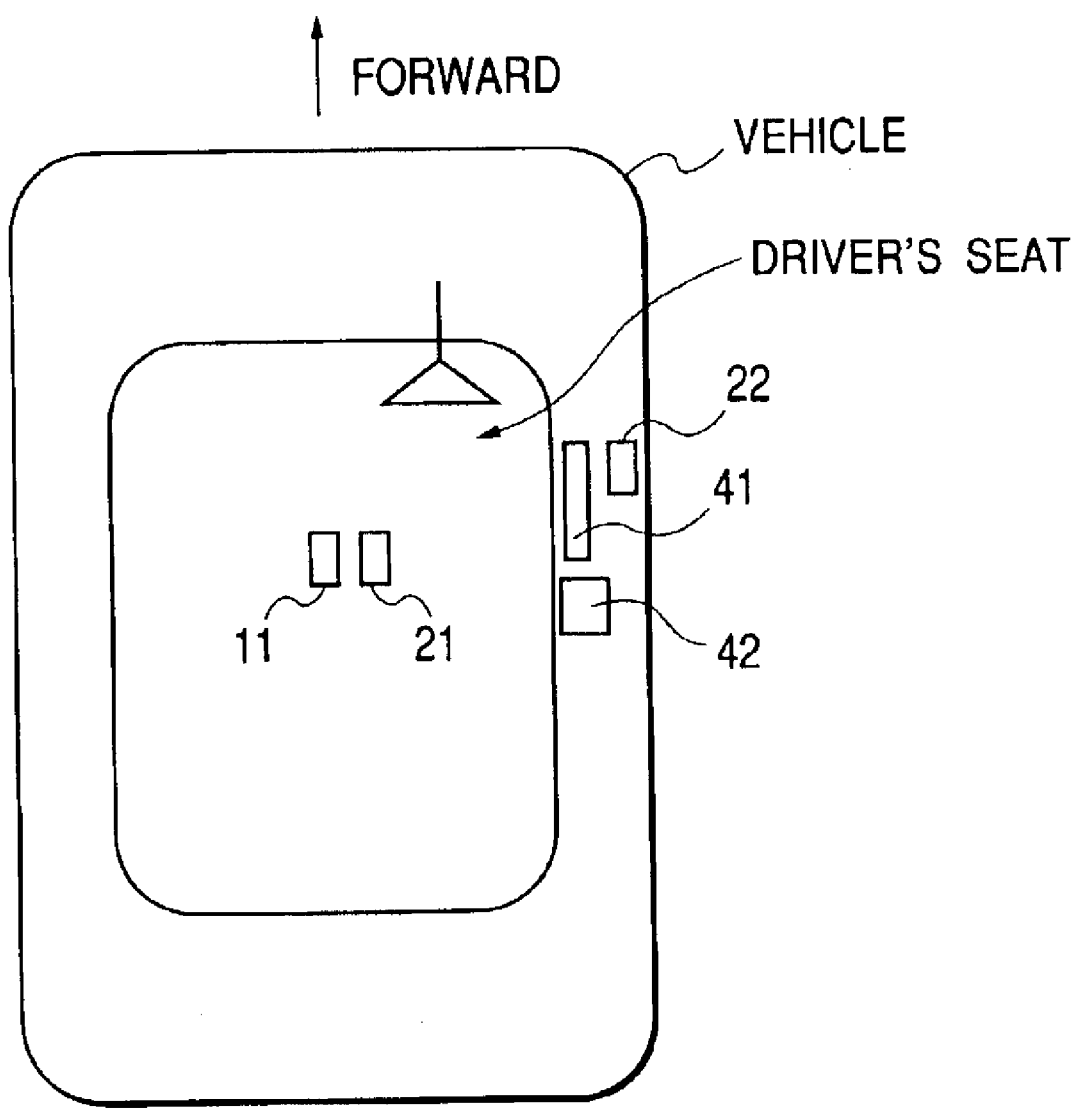
FIG. 2 is a plan view illustratively showing locations of components in a vehicle.

As FIG. 2 shows, the curtain air bag 41 is provided above a driver's seat side roof in the interior of a motor vehicle and is of a type spreading into a curtain-like configuration along a side surface portion of the vehicle, and functions as a kind of passenger protection apparatus for, at the occurrence of a roll of the vehicle, preventing a passenger(s) from being thrown out into the exterior of the vehicle (in a case in which a window is in an open state) or preventing the passenger from being collided against an internal member such as a door of the vehicle (in a case in which a window is in a closed state or in a slightly open state).

The pretentioner 42 is an explosive type take-up device designed to take up, a seat belt instantaneously at the time of the occurrence of a collision or roll of a vehicle or the like.

The control unit 30 is composed of a CPU 30$a$, a ROM 30$b$ and a RAM 30$c$, and the CPU 30$a$ reads out and executes a control program(s) stored in the ROM 30$b$, thereby realizing a relative angle calculating means 31, a threshold switching means 32, a roll judging means 33, a drive control (including spread control) means 34, and a threshold switching means 35. The processing to be conducted in the CPU 30$a$ will be described later.

The angular velocity sensor 11 is provided at a central portion of the interior of the vehicle as shown in FIG. 2 for detecting a roll signifying a motion of the vehicle in its right-hand and left-hand directions to output it in the form of a roll angular velocity signal. For example, as the angular velocity sensor 11, it is possible to use a sensor of the type detecting a rotation angular velocity through the use of the Coriolis force.

The buckle switch 21 is a device made to output a signal indicative of a wearing state (wearing or non-wearing state) of a seat belt (not shown). In this case, when a signal from the buckle switch 21 takes an ON state, it shows that the seat belt is in a wearing state, and if the signal therefrom takes an OFF state, it is representative of a non-wearing state of the seat belt.

The window opening/closure sensor 22 is a device made to output a window opening/closure signal indicative of an open/closed state of a window. In this case, an open-state signal is to be outputted therefrom in a case in which the window is in a fully opened condition or in a largely opened condition, which signifies that there is a high possibility of the occurrence of the throw-out of a passenger into the exterior of the vehicle at the time of the occurrence of a roll of the vehicle. On the other hand, a closed-state signal is to be outputted in a case in which the window is in a completely closed condition or in a slightly open condition, which signifies that there is a low possibility of the occurrence of the throw-out of a passenger into the exterior of the vehicle at the time of the occurrence of a roll of the vehicle but there is a high possibility of the occurrence of a collision of the passenger against a structure in the interior of the vehicle.

Secondly, referring to a flow chart of FIG. 3, a description will be given hereinbelow of a flow of the processing of a passenger protection apparatus activation main routine.

The operational flow starts at the execution of a roll judgment threshold and curtain air bag spread method setting routine, thereby storing, in a storage area of the RAM 30$c$, a set roll judgment threshold and a set value of a spread method for the curtain air bag 41, which correspond to the results of detection by the buckle switch 21 and the window opening/closure sensor 22 (step 1, which will hereinafter be referred to simply as "S1, and other steps will be expressed in like manner). The processing contents of the roll judgment threshold and bag spread method setting routine will be described in detail later.

Furthermore, a roll angular velocity signal is read out from the angular velocity sensor 11 (S2) and a roll relative angle $\theta$ of the vehicle is calculated by integrating a roll angular velocity $\omega$ (S3). In this case, the roll relative angle of the vehicle signifies a relative roll angle with respect to a posture of a vehicle at the time of the turning-on of a power switch of the vehicle and indicates an inclination of the vehicle in right-hand and left-hand directions after the turning-on of the power switch. Thus, a behavior of the vehicle in its right-hand and left-hand directions is detected by detecting the roll angular velocity and the roll relative angle.

Figure 5:
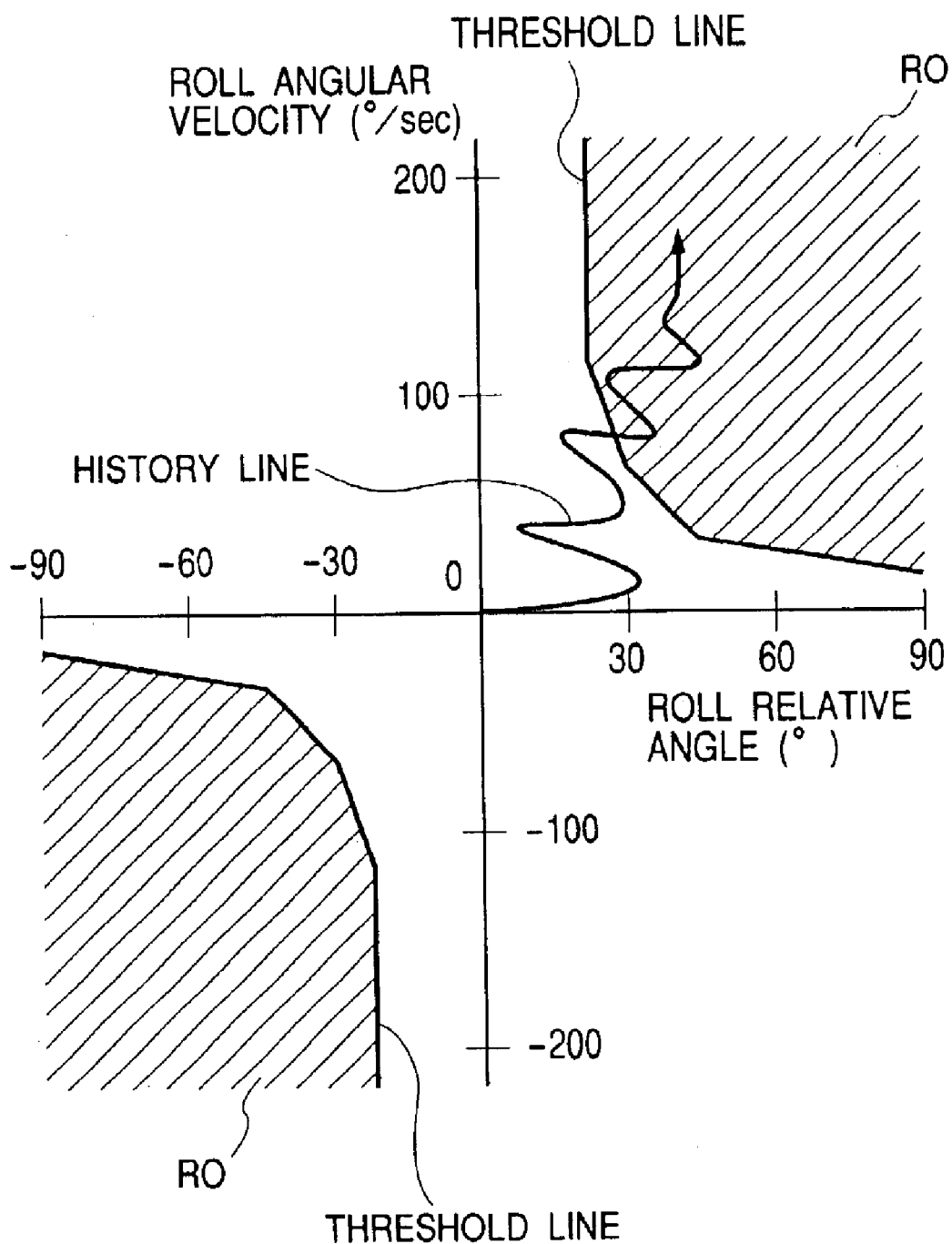
FIG. 5 is an illustration of a two-dimensional map indicating a roll area R0 based on roll angular velocities and roll relative angles for judgment on the occurrence of a roll.
Figure 6A:
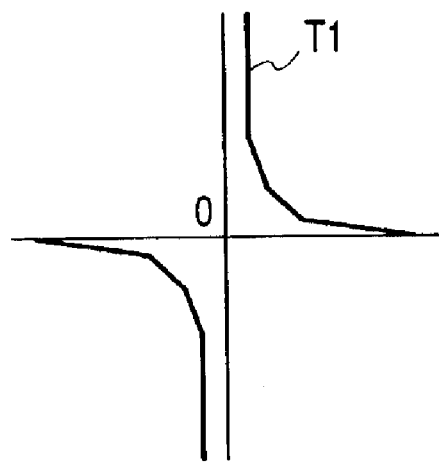
FIGS. 6A to 6D are illustrations useful for explaining examples of setting of threshold lines T1 to T4.
Figure 6B:
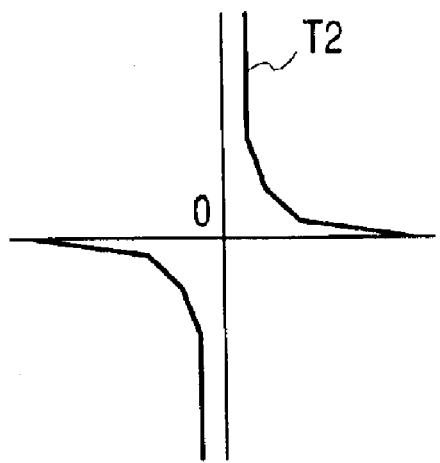
Figure 6C:
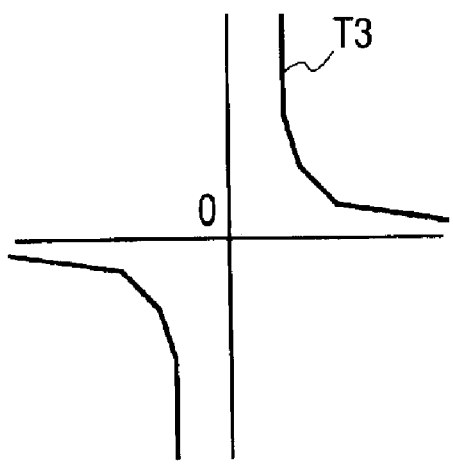
Figure 6D:
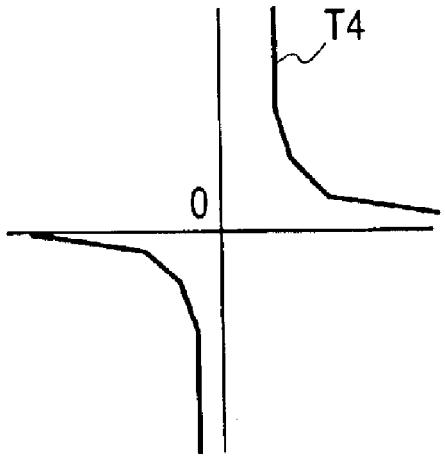
Figure 7:
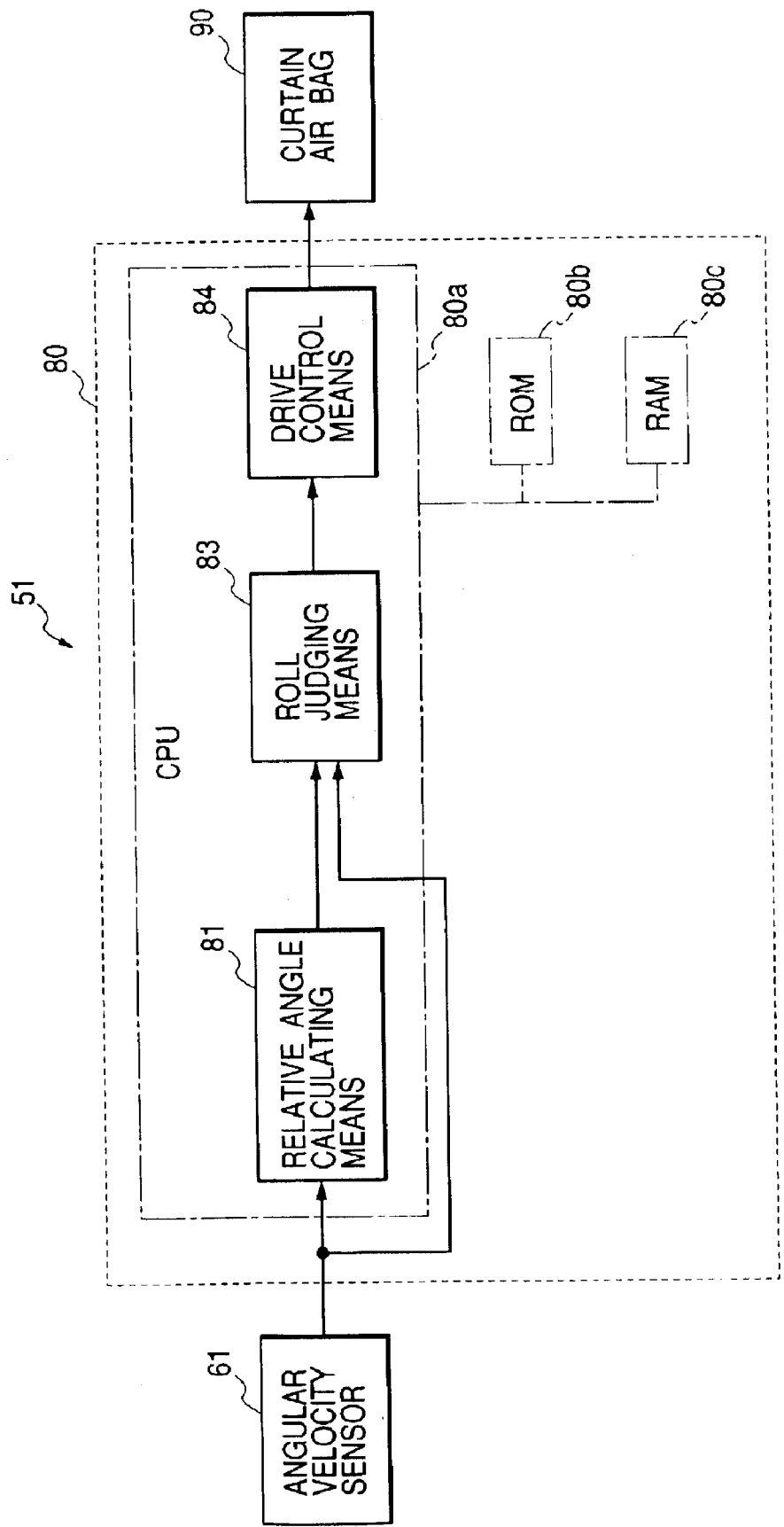
FIG. 7 is a block diagram schematically showing a configuration of a passenger protection apparatus activation system according to a conventional technique.

Subsequently, as shown in FIG. 5, a threshold line is set on a two-dimensional map using a roll angular velocity and a roll relative angle as parameters, and a judgment is made as to whether or not a history line based on a roll angular velocity detected by the angular velocity sensor 21 and a roll relative angle calculated by the relative angle calculating means 31 (S3) runs from a non-roll area lying on a side of the origin 0 with respect to the threshold line and goes across the threshold line to enter a roll area R0 lying on a side opposite to the origin 0 with respect to the threshold line (S4). The threshold line on the two-dimensional map shown in FIG. 5 is determined in the roll judgment threshold and curtain air bag spread method setting routine in S1 and is put in a storage area of the RAM 30$c$.

If the history of the roll angular velocity $\omega$ and the roll relative angle $\theta$ does not exceed the threshold line (S4: No), the processing S1 and subsequent processing are repeatedly conducted.

On the other hand, if the history of the roll angular velocity $\omega$ and the roll relative angle $\theta$ exceeds the threshold line and enters the roll area R0, a vehicle roll judgment is made to activate the P/T 42 (S5). However, the activation of the P/T 42 is made only when the seat belt is worn, while it is not made for the non-wearing of the seat belt.

Moreover, the curtain air bag 41 is drive-controlled on the basis of the bag spread pressure and the spread direction which exist in the storage area of the RAM 30$c$ (S6).

Figure 3:
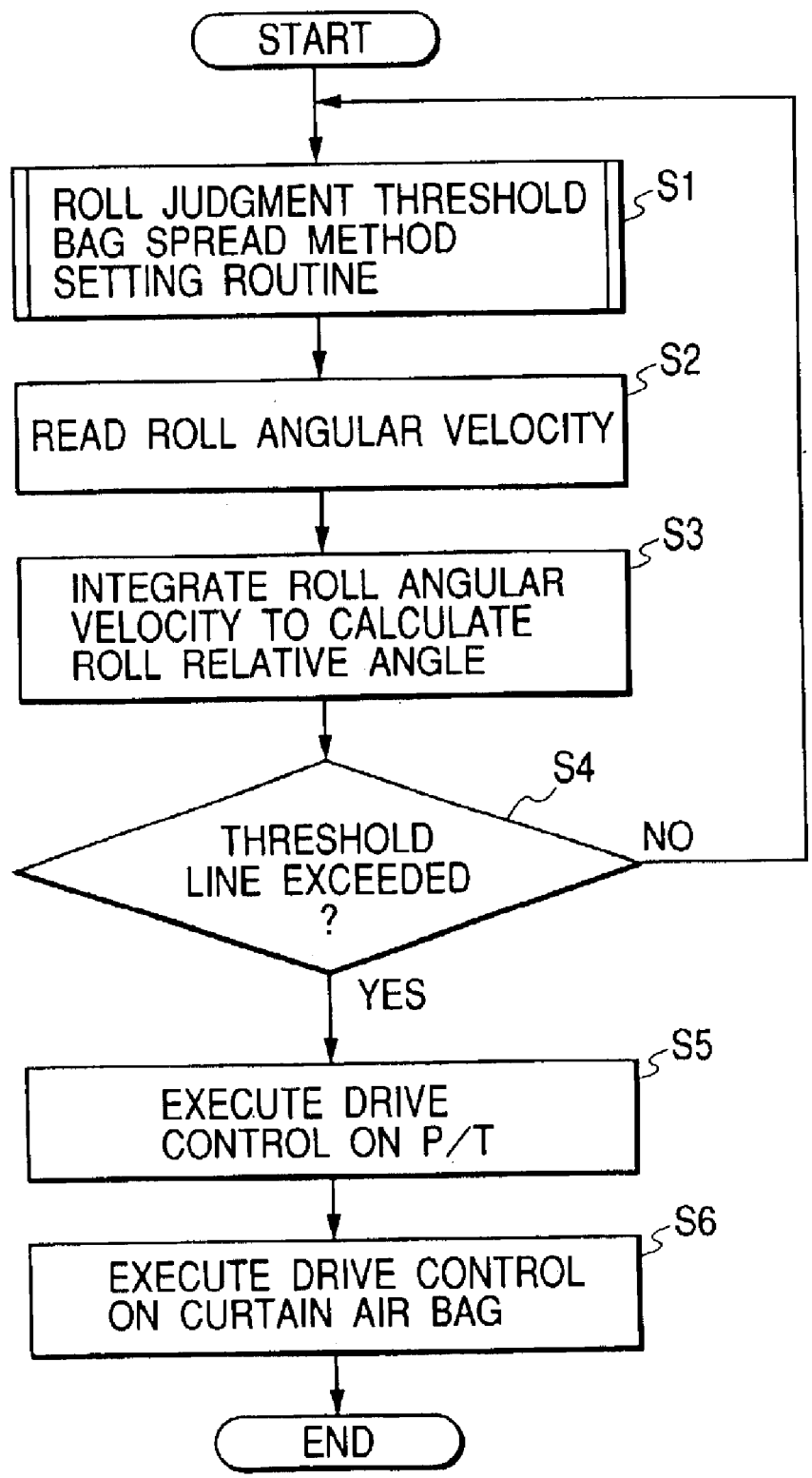
FIG. 3 is a flow chart showing a flow of the processing of a passenger protection apparatus activation main routine.

The step S3 in the flow chart of FIG. 3 corresponds to the relative angle calculating means 31 in the block diagram of FIG. 1, the step S4 therein corresponds to the roll judging means 33 in the block diagram of FIG. 1, and the steps S5 and S6 correspond to the drive control means 34 in the block diagram of FIG. 1.

Figure 4:
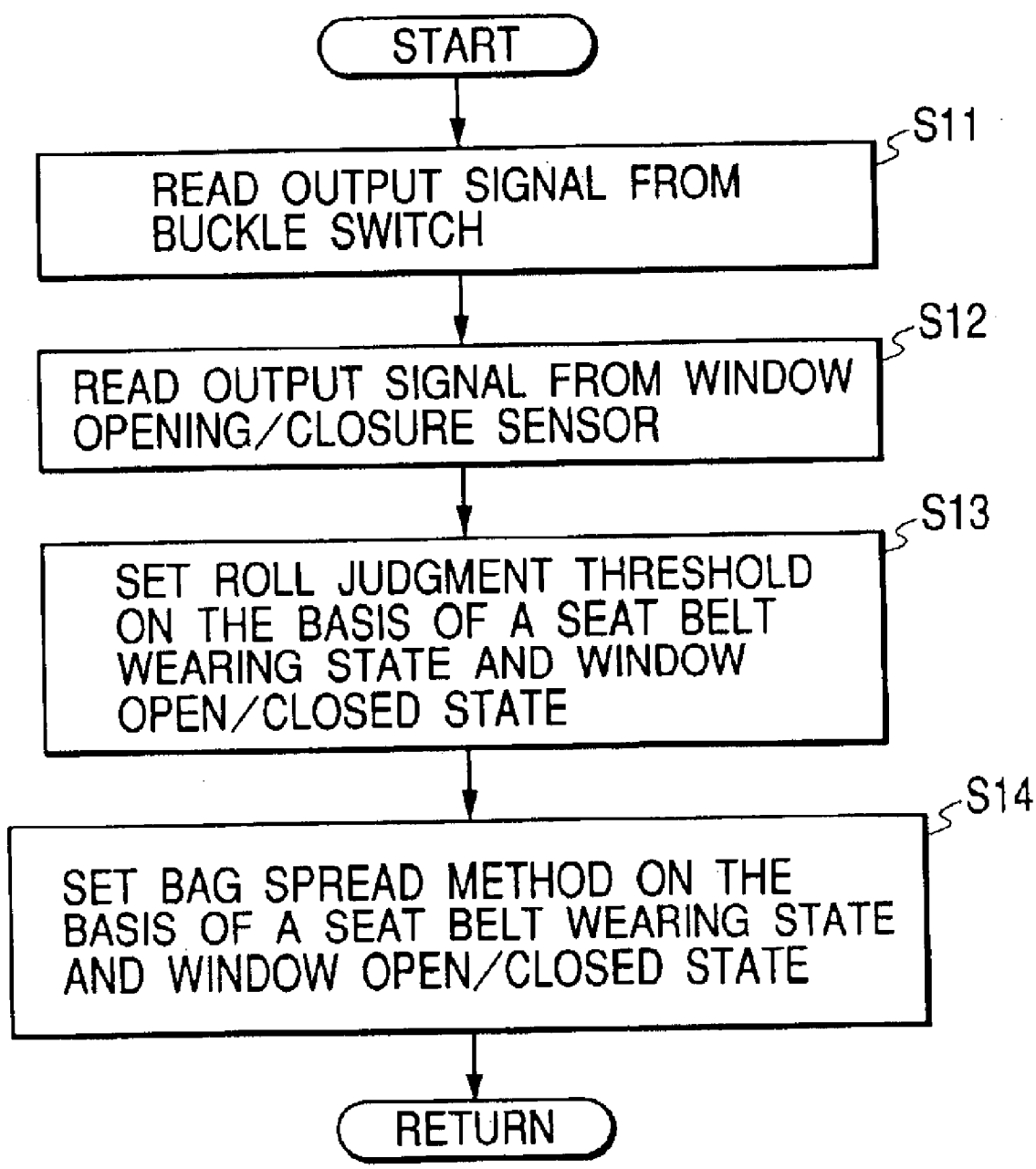
FIG. 4 is a flow chart showing a flow of the processing of a roll judgment threshold and bag spread method setting routine.

In addition, referring to a flow chart of FIG. 4, a description will be given hereinbelow of a flow of the processing in the roll judgment threshold and bag spread method setting routine. The roll judgment threshold and curtain air bag spread method setting routine is a processing routine for setting a roll judgment threshold and a curtain air bag spread method on the basis of the outputs of the buckle switch 21 and the window opening/closure sensor 22.

First, an output signal from the buckle switch 21 is read (S11), and a window opening/closure signal from the window opening/closure sensor 22 is read (S12).

Following this, a roll judgment threshold is set on the basis of a seat belt wearing state detected in S11 and a window open/closed state detected in S12 (S13). That is, as shown in Table 1, a threshold line T1 is selected as the above-mentioned threshold line in a case in which the seat belt is in a non-wearing state and the window is in a closed state, a threshold line T2 is selected as the foregoing threshold line in a case in which the seat belt is in a non-wearing state and the window is in an open state, a threshold line T3 is selected as the foregoing threshold line in a case in which the seat belt is in a wearing state and the window is in a closed state, and a threshold line T4 is selected as the foregoing threshold line in a case in which the seat belt is in a wearing state and the window is in an open state, with the selection result thereof being put in a storage area of the RAM 30c.

TABLE 1

Setting of Threshold Line for Roll Judgment

| Seat Belt | State of Window | Threshold Line |
| --- | --- | --- |
| non-wearing | closed | T1 |
| non-wearing | open | T2 |
| wearing | close | T3 |
| wearing | open | T4 |

On the basis of the experimental results, the threshold lines T1 to T4 are set so that a timing of a judgment on a roll is optimized on each condition. FIGS. 6A to 6D are illustrations of examples of setting of the threshold lines T1 to T4. In the examples of FIGS. 6A to 6D, in comparison between the threshold lines T1 and T3, the threshold line T1 is set closer to the origin 0 than the threshold line T3. This is because, in a case in which the seat belt is in a non-wearing state, the possibility of the throw-out of a passenger (s) into the exterior of the vehicle becomes high at an initial stage after a roll starts and, hence, it is desirable that a judgment on a roll is made at an earlier stage. Likewise, in comparison between the threshold lines T2 and T4, the threshold line T2 is set closer to the origin than the threshold line T4. This is because, in a case in which the seat belt is in a non-wearing state, the possibility of the collision of the passenger(s) against a structure in the interior of the vehicle becomes high at an initial stage after a roll starts and, hence, it is desirable that a judgment on a roll is made at an earlier stage.

Subsequently, a bag spread method is set on the basis of the seat belt wearing state detected in S11 and the window open/closed state detected in S12 (S14).

That is, as shown in Table 2, in a case in which the seat belt is in a non-wearing state and the window is in a closed state, the bag spread pressure of the curtain air bag 41 is set to "normal" and the spread direction thereof is set to "normal". On the other hand, in a case in which the seat belt is in a non-wearing state and the window is in an open state, the bag spread pressure of the curtain air bag 41 is set to "high" and the spread direction thereof is set to "outward".

TABLE 2

Setting of Bag Spread Pressure and Spread Direction of Curtain Air Bag

| Seat Belt | State of Window | Bag Spread Pressure | Bag Spread Direction |
| --- | --- | --- | --- |
| non-wearing | closed | normal | normal |
| non-wearing | open | high | outward |
| wearing | closed | slow roll: 0 (fast roll: normal) | normal |
| wearing | open | slow roll: 0 (fast roll: high) | outward |

In this case, the reason that the bag spread pressure is set to "high" in a case in which the seat belt is in a non-wearing state and the window is in an open state is to securely prevent the throw-out of a passenger(s) into the exterior of the vehicle by spreading the bag (high pressure), and the reason that the spread direction thereof is set to "outward" in the same case is to take into consideration the fact that the bag tends to be driven toward the interior side of the vehicle by wind flowing through the window into the interior of the vehicle.

In addition, when the seat belt is in a wearing state, the bag spread pressure of the curtain air bag 41 is set to "0 (non-spread)" irrespective of the open/closed state of the window. This is because, in the case of a usual low-speed roll, the seat belt is taken up by the activation of the P/T 42 to prevent a passenger(s) from being thrown out into the exterior of the vehicle or being collided against a structure in the interior of the vehicle so that there is no need to spread the curtain air bag 41. On the other hand, in the case of a high-speed roll such as a trip-over type roll that a vehicle does a sideslip to make its tire(s) collide against a curb stone or the like so that the vehicle leads rapidly to a roll (that is, in a case in which the roll angular velocity detected by the angular velocity sensor 21 exceeds a predetermined value), regardless of the setting in this step, in the drive control step (S6), when the window is in an open state, the bag spread pressure is forcibly set to "high", and the spread direction is forcibly set to "outward", and when the window is in a closed state, the bag spread pressure is forcibly set to "normal" and the spread direction is forcibly set to "normal", and the curtain air bag is activated in this condition. Therefore, in the case of a high-speed roll, in addition to the take-up of the seat belt by the P/T 42, the curtain air bag 41 is spread, thereby protecting the passenger more securely.

The step S13 corresponds to the threshold setting means in the present invention or the threshold switching means 35 in FIG. 1, the step S14 corresponds to the spread method setting means in the present invention or the bag spread setting means 32 in FIG. 1.

As obvious from the above description, with the passenger protection apparatus activation system 1 according to this embodiment, since the threshold condition for the judgment on a roll of a vehicle is appropriately set on the basis of a window open/closed state of the vehicle and a seat belt wearing state thereof, a roll judgment is made at an appropriate timing corresponding to a state to activate the passenger protection apparatus, thereby more surely preventing a passenger(s) from being collided against a structure in the interior of the vehicle or being thrown out into the exterior of the vehicle.

It should be understood that the present invention is not limited to the above-described embodiment, and that it is intended to cover all changes and modifications of the embodiment of the invention herein which do not constitute departures from the spirit and scope of the invention.

For example, although in the above-described embodiment the present invention has been applied to a passenger protection apparatus activation system designed to activate the P/T 42 and the curtain air bag 41 placed on a driver's seat side, the present invention is naturally applicable to a passenger protection apparatus activation system made to activate a P/T and a curtain air bag provided for another seat.

In addition, although in the above-described embodiment an explosive type pretentioner is employed as the belt take-up device, it is also appropriate that the present invention is applied to an apparatus made to take up a seat belt in a repeated fashion through the use of a motor or the like, such as taking up the belt by means of an electric motor. In brief, the present invention is applicable an activation device for all types of passenger protection apparatus to be activated at the time of the occurrence of a roll of a motor vehicle.

Still additionally, although in the above-described embodiment the threshold condition (that is, the threshold line on the two-dimensional map shown in FIG. 5) for the judgment on a roll of a vehicle is set on the basis of both a vehicle window open/closed state and seat belt wearing state, it is also appropriate that the threshold condition (threshold line) is set on the basis of one of the vehicle window open/closed state and the seat belt wearing state.

Moreover, although in the above-described embodiment a bag spread method is set in addition to a roll judgment threshold (the processing in S14, bag spread method setting means 32), it is omissible.

Still moreover, although in the above-described embodiment a bag spread pressure and a bag spread direction are set as the bag spread method for the curtain air bag 41 in the processing of S14 (see Table 2), it is also appropriate that a bag spread configuration (wide band-like spread, local spread, or the like) and others are further set, or that only one of these can be set.

As described above, with a passenger protection apparatus activation device according to the present invention, since a threshold condition for the judgment on a roll of a vehicle is appropriately set on the basis of at least one of a vehicle window open/closed state and a seat belt wearing state, a roll judgment is made at an appropriate timing corresponding to that state for activating the passenger protection apparatus, thereby providing an effect of more surely preventing a passenger(s) from being collided against a structure in the interior of the vehicle or from being thrown out into the exterior of the vehicle.

Furthermore, it is also appropriate that the roll angle and the roll angular velocity are calculated through the use of an acceleration sensor as disclosed in Japanese Patent Laid-Open No. 2001-260785.

Still furthermore, it is also appropriate that, as disclosed in Japanese Patent Laid-Open No. (HEI) 7-164985, a roll of a vehicle is detected on the basis of the relationship between an inclination angle detected by an inclination angle detecting means and a tilting angular velocity detected by a tilting angular velocity detecting means. In this case, the border line between an operation area and a non-operation area may be changed therefor.

What is claimed is:

1. An activation device for a passenger protection apparatus which is made to activate said passenger protection apparatus in accordance with a behavior of a vehicle, comprising:

an angular velocity sensor for detecting a roll angular velocity of said vehicle;

relative angle calculating means for calculating a roll relative angle of said vehicle on the basis of the roll angular velocity detected by said angular velocity sensor;

roll judging means for making a judgment indicating the occurrence of a roll of said vehicle when the roll angular velocity detected by said angular velocity sensor and the vehicle roll relative angle calculated by said relative angle calculating means satisfy a predetermined threshold condition;

drive control means for activating said passenger protection apparatus when said roll judging means makes the vehicle roll judgment;

state detecting means having at least one of a window opening/closure sensor for detecting an open/closed state of a window of said vehicle and a buckle switch for detecting a wearing state of a seat belt; and threshold setting means for setting said predetermined threshold condition on the basis of a result of the detection by said state detecting means.

2. The device according to claim 1, wherein said passenger protection apparatus includes a curtain air bag.

3. The device according to claim 2, further comprising spread method setting means for setting a spread method for said curtain air bag on the basis of a result of the detection by said state detecting means.

4. The device according to claim 3, wherein said spread method setting means sets at least one of a spread pressure of said curtain air bag, a spread configuration thereof and a spread direction thereof.

5. The device according to claim 2, further comprising a belt take-up device for taking up said seat belt instantaneously so that said drive control means activates said belt take-up device when said roll judging means makes a judgment indicating the occurrence of a roll of said vehicle and executes spread/non-spread control of said curtain air bag in accordance with the roll angular velocity detected by said angular velocity sensor.

6. The device according to claim 1, wherein said roll judging means sets a threshold line on a two-dimensional map using a roll angular velocity and a roll relative angle as parameters and makes a judgment indicating the occurrence of a roll of said vehicle when a history line drawn on the basis of the roll angular velocity detected by said angular velocity sensor and the roll relative angle calculated by said relative angle calculating means runs from a non-roll area lying on a side of an origin with respect to said threshold line to a roll area lying on a side opposite to said origin with respect to said threshold line, and said threshold setting means includes threshold switching means for setting said threshold line on the basis of a result of the detection by said state detecting means.

7. The device according to claim 6, wherein said threshold switching means sets said threshold line on the basis of one of a window open/closed state detected by said state detecting means, a seat belt wearing state detected by said state detecting means and a combination of said window open/closed state and said seat belt wearing state.

8. The device according to claim 1, wherein said state detecting means includes both said window opening/closure sensor and said buckle switch.

9. An activation device for a passenger protection apparatus which is made to activate said passenger protection apparatus in accordance with a behavior of a vehicle, comprising:

roll judging means for detecting said behavior of said vehicle to make a judgment indicating the occurrence of a roll of said vehicle when said vehicle behavior detected satisfies a predetermined condition;

drive control means for activating said passenger protection apparatus when said roll judging means makes a judgment indicating the occurrence of a roll of said vehicle;

state detecting means having at least one of a window opening/closure sensor for detecting an open/closed state of a window of said vehicle and a buckle switch for detecting a wearing state of a seat belt; and threshold setting means for setting said predetermined condition on the basis of a result of the detection by said state detecting means.

* * * * *